Patented Feb. 15, 1949

2,461,882

UNITED STATES PATENT OFFICE 2,461,882

FURFURYL ALCOHOL RESIN AND PROCESS OF MAKING THE SAME

Edward R. Dillehay, Glen Ellyn, and Robert D. Schuetz, Chicago, Ill., assignors to The Richardson Company, Lockland, Ohio, a corporation of Ohio No Drawing. Application March 24, 1945, Serial No. 584,726

7 Claims. (Cl. 260—92.6)

Our invention relates to the production of furfuryl alcohol resin having certain properties of desirability in various arts, same being the result of a novel practice of preparation of the same.

It has been quite generally understood that acid reacting substances are the required polymerizing agents for the making of resins from furfuryl alcohol. Thus phosphoric acid and surphuric acid are accepted activation catalysts, acid reacting amines and acid reacting metallic salts.

In theory these activation agents produce hydrogen ions or protons which are responsible for the catalytic effect in the transformation of furfuryl alcohol to useful resinous products of high polymeric or resinous character, but which have a structure resulting from intermolecular condensation of a reactive olefin type of structure.

We have found that elemental sulfur will act as a catalyst in forming a resinous substance with furfuryl alcohol, but one which differs in amount of polymerization, due to the fact, as we regard it from the point of view of theory, that the resonance of the ring compound is not completely broken down.

The sulfur causes polymerization, gives a controllable rate of polymerization depending upon the temperature and time of treatment, and above all gives a neutral resinous material entirely free of the defects of the acidic resins hitherto resulting from the accepted types of polymerization.

Two specific examples will be given, one in which no pressure was employed, and one in which the reaction was caused to take place under pressure in an autoclave.

*Example 1.*—Freshly distilled furfuryl alcohol was employed distilled under reduced pressure (24 inches of vacuum) with a boiling range of distillate collected being 167 to 170° C. (332 to 338° F.) at atmospheric pressure.

In an Erlenmeyer flask fitted with a reflux condenser was placed 500 cc. (565 gr., 5.30 moles) of furfuryl alcohol; $C_4H_3O$ $CH_2OH$. To this was added 500 cc. (27.6 moles) of water; $H_2O$. Lastly the catalyst sulfur was added, 5 gr. (0.156 mole). The mixture was stirred vigorously to get as good a suspension as possible. The entire mixture was heated under reflux temperature (212° F.) for a period of eighteen hours in which time a dark viscous material had separated out from the reaction medium. The reaction vessel was allowed to cool to room temperature and the top or water layer was decanted off. The viscous material was further polymerized by heating in an electrically heated oven at 260° F. Its viscosity gradually increased and after twenty-four hours it had a very heavy viscous nature, being almost black in color. On allowing it to cool to room temperature it was transformed into a soft semi-elastic type of material.

It is important to point out here that the water used as a reaction medium must be neutral and contain no basic types of salts, as these act as inhibitors in the polymerization of furfuryl alcohol by sulfur. When ordinary tap water is used the polymerization is completely arrested due to the salts which it contains. It has been found that the best solvent or reaction medium to use is distilled water. The water has a twofold purpose; besides being a medium in which to carry out the polymerization it promotes the polymerization. This promoting effect results from the fact that since water is a polar solvent it causes induced dipoles to be set up in the furfuryl alcohol, which accelerates the formation of sulfonium complexes, the active intermediates resulting from the catalytic action of the sulfur on the furfuryl alcohol.

*Example II.*—As has been stated above, the polymerization reaction required eighteen hours at 212° F. In order to increase the rate of polymerization and thereby shorten the time required to produce the resin, this same reaction was run under high pressures.

This was accomplished in the following manner. The same quantities of material were used as described above and were again put in an Erlenmeyer flask. The flask containing the reaction mass was then placed in a steam jacketed autoclave and a steam pressure of sixty pounds per square inch was applied to the jacket. This caused some of the material in the reaction chamber to volatilize and produce a pressure in the reaction chamber of the autoclave equal to the steam pressure in the autoclave jacket. In this manner the temperature of the reaction mass was brought up to the temperature corresponding to sixty pounds steam pressure. Under this elevated temperature the polymerization which required eighteen hours was brought about in one hour. As the polymerization is exothermic a great deal of heat is liberated by the reaction and once polymerization has set in, which takes about twenty minutes, the steam in the jacket was shut off and the heat liberated by the reaction maintained the temperature of the reaction mass.

After the polymerization was complete, cold water was run through the steam jacket to reduce the pressure in the reaction chamber to atmospheric pressure, after which the autoclave was opened and the reaction vessel removed. The resulting resin could be handled in the same manner as was described above.

The high temperature (around 293° F.) results in a resin after one hour which can further be cured as in the first instance to a final stage of polymerization, but a lesser period of heating is required, to complete the condensation action.

As compared with acidic furfuryl alcohol resins, the resulting product may be admixed with solvents such as acetone and ethyl alcohol, to produce varnishes for impregnating paper, linen or canvas for making them into acid resistant laminated materials for example, without the hydrolyzing effect on the fibers which takes place when the acidic resins are used. The control of the degree of polymerization in the concluding heating cycle, permits of preparation of acid protective substances for use in compounds with rubber and bitumen. Molding powders can be formed of this resin which result in acid resistant molded articles.

Having thus described our invention, what we claim as new and inherent in the examples given is:

1. That process for polymerization of furfuryl alcohol under heat which employs sulfur as the catalytic agent under neutral conditions and in the presence of water.

2. That process for polymerization of furfuryl alcohol under heat which employs sulfur as the catalytic agent under neutral conditions in the presence of water followed by heating the resulting resinous product after separation from the water.

3. That process for polymerization of furfuryl alcohol under heat which employs sulfur as the catalytic agent under neutral conditions in the presence of distilled water, followed by heating the resinous product when separated from the aqueous constituent.

4. The process of claim 1 in which substantially equal weights of furfuryl alcohol and water are employed, and around one percent of elemental sulfur with relation to the amount by weight of the alcohol.

5. The process set forth in claim 1, in which the reaction takes place under pressure at a temperature equivalent to around sixty pounds of steam.

6. A resinous material which is the result of the polymerization of furfuryl alcohol under heat with sulphur as the catalytic agent, and under neutral conditions in the presence of water.

7. A resinous material which is the result of the polymerization of furfuryl alcohol under heat with sulphur as the catalytic agent, and under neutral conditions in the presence of water, followed by heating the partially polymerized material after separation from the water.

EDWARD R. DILLEHAY.
ROBERT D. SCHUETZ.

REFERENCES CITED

The following references are of record in the file of this patent:

UNITED STATES PATENTS

| Number | Name | Date |
|---|---|---|
| 2,334,526 | Allison | Nov. 16, 1943 |
| 2,368,426 | Root | Jan. 30, 1945 |
| 2,377,995 | Coes | June 12, 1945 |

OTHER REFERENCES

Penn British Plastics July, 1944, pages 286–292.